(12) United States Patent
Yamazaki et al.

(10) Patent No.: US 8,694,187 B2
(45) Date of Patent: Apr. 8, 2014

(54) CONTROL APPARATUS AND CONTROL METHOD FOR VEHICLE

(75) Inventors: Makoto Yamazaki, Gotenba (JP); Osamu Harada, Toyota (JP); Shunsuke Fusiki, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 7 days.

(21) Appl. No.: 13/266,939

(22) PCT Filed: Jul. 28, 2010

(86) PCT No.: PCT/IB2010/001854
§ 371 (c)(1),
(2), (4) Date: Oct. 28, 2011

(87) PCT Pub. No.: WO2011/024038
PCT Pub. Date: Mar. 3, 2011

(65) Prior Publication Data
US 2012/0150374 A1 Jun. 14, 2012

(30) Foreign Application Priority Data
Aug. 31, 2009 (JP) ................................ 2009-200026

(51) Int. Cl.
*B60L 9/00* (2006.01)
(52) U.S. Cl.
USPC .......................................................... 701/22
(58) Field of Classification Search
USPC .......................................................... 701/22
See application file for complete search history.

(56) References Cited

U.S. PATENT DOCUMENTS

| 6,464,027 | B1 * | 10/2002 | Dage et al. ................. 180/65.22 |
| 2003/0172643 | A1 | 9/2003 | Suzuki |
| 2008/0282673 | A1 | 11/2008 | Gonze et al. |

FOREIGN PATENT DOCUMENTS

| EP | 0 922 599 A2 | 6/1999 |
| JP | 2003-214308 A | 7/2003 |
| JP | 2003-269208 A | 9/2003 |
| JP | 2005-105950 A | 4/2005 |
| JP | 2005248875 A * | 9/2005 |

OTHER PUBLICATIONS

International Search Report mailed Jul. 4, 2011 and Written Opinion of PCT/IB2010/001854.

* cited by examiner

*Primary Examiner* — Behrang Badii
*Assistant Examiner* — Daniel L Greene
(74) *Attorney, Agent, or Firm* — Kenyon & Kenyon LLP

(57) ABSTRACT

An ECU (Electronic Control Unit) that controls a plug-in hybrid vehicle starts an engine when a required power as a value obtained by subtracting a required discharge amount from a drive power is larger than a threshold during intermittent control in a CD (Charge Depletion) mode, and stops the engine when the required power is smaller than a threshold. When intermittent control is being performed in the CD mode, the ECU limits the required discharge amount Pout to a relatively small value in a range where an engine coolant temperature is low, and sets the required discharge amount relatively large instead of imposing a limit thereon in a range where the engine coolant temperature is high.

15 Claims, 10 Drawing Sheets

CONTROL APPARATUS AND CONTROL METHOD FOR VEHICLE

BACKGROUND OF THE INVENTION

1. Field of the Invention

The invention relates to the control of a vehicle, and more particularly, to the control of a hybrid vehicle.

2. Description of the Related Art

As the related art, there is known a hybrid vehicle that runs with the aid of a motive power of at least one of an engine and a motor. In the hybrid vehicle, as a rule, the storage amount of a battery for supplying an electric power to the motor is held within a predetermined range. For example, when the storage amount of the battery becomes equal to or smaller than a lower limit of the predetermined range, the engine is forcibly driven. The battery is charged with an electric power generated through the use of a driving force of the engine. As a result, the storage amount of the battery is restored.

However, when the engine is immediately started to charge the battery, inconveniences such as a deterioration in emission properties and the like occur because the engine and a catalyst for purifying exhaust gas from the engine have not been warmed up. Thus, the engine, the catalyst and the like need to be warmed up before the engine is started. An art concerning this warm-up is disclosed in Japanese Patent Application Publication No. 2003-269208 (JP-A-2003-269208).

A control apparatus disclosed in Japanese Patent Application Publication No. 2003-269208 (JP-A-2003-269208) is installed in a hybrid vehicle that runs with the aid of a driving force of at least one of an engine and a motor, and the engine is driven to charge a battery for supplying an electric power to the motor when the storage amount of the battery becomes equal to or smaller than a lower limit. This control apparatus heats the engine and a catalyst in advance by means of a heater when the storage amount of the battery becomes equal to a predetermined value larger than the lower limit. Thus, since the engine and the catalyst have already been warmed up when the engine is started, a deterioration in emission properties can be prevented. As a result, the vehicle can run appropriately.

Meanwhile, there has recently been developed a hybrid vehicle equipped with a battery that supplies an electric power to a motor and can be charged with an electric power from a power supply outside the vehicle, such as a household power supply or the like (hereinafter referred to also as "a plug-in hybrid vehicle).

The electric power from the household power supply is efficiently generated by an electric power company or the like. In general, therefore, the plug-in hybrid vehicle is designed to run using the electric power of the battery by priority.

For example, the running mode of the plug-in hybrid vehicle is set as a mode in which the vehicle runs by priority only with the aid of the motive power of the motor (hereinafter referred to also as "a charge depleting mode (CD mode)") until the storage amount of the battery becomes smaller than a lower limit. A transition to a mode in which the vehicle runs using the motive power of the engine and the motive power of the motor (hereinafter referred to also as "a charge sustain mode (CS mode)") is made when the storage amount of the battery becomes smaller than the lower limit.

In this plug-in hybrid vehicle, when the engine is started without warming up the catalyst during the transition to the CS mode, there is an apprehension for a deterioration in emission properties. Therefore, the catalyst is warmed up in advance during the CD mode prior to the transition to the CS mode, and the emission purification performance during the transition to the CS mode is thereby ensured. However, in the case where the vehicle is designed to warm up the catalyst with exhaust gas from the engine, the engine needs to be started to warm up the catalyst during the CD mode. The discharge amount of the battery decreases as a result of this startup of the engine. Thus, an actual running distance in the CD mode is longer than a distance recognized by a user, and a user feels a sense of incongruity.

SUMMARY OF INVENTION

The invention provides a control apparatus and a control method that can ensure emission purification performance during a transition from a CD mode to a CS mode without causing a sense of incongruity to a user in a plug-in hybrid vehicle.

A first aspect of the invention relates to a control apparatus for a vehicle that includes an internal combustion engine, a catalyst for purifying an exhaust gas of the internal combustion engine, a storage device capable of being charged with an electric power from a power supply outside the vehicle, and a rotational electrical machine driven by an electric power of the storage device, and that has, as running modes, a first mode in which the vehicle runs with an aid of a motive power of the rotational electrical machine with the internal combustion engine stopped in principle so as to give higher priority to consumption of the electric power of the storage device than to conservation thereof and a second mode in which the vehicle runs with an aid of a motive power of the internal combustion engine and a motive power of the rotational electrical machine with the internal combustion engine operated according to need so as to give higher priority to conservation of the electric power of the storage device than to consumption thereof. This control apparatus includes a control portion that performs intermittent control to intermittently operate the internal combustion engine in accordance with a required discharge amount, namely, an amount of an electric power to be discharged from the storage device even in the first mode when a predetermined condition on warm-up of the catalyst is fulfilled during the first mode, and a calculation portion that calculates the required discharge amount on a basis of a temperature of the internal combustion engine when the intermittent control is performed during the first mode.

In the control apparatus according to this aspect of the invention, the vehicle may further include a sensor that detects a temperature of a coolant for the internal combustion engine, and the calculation portion may calculate the required discharge amount such that the intermittent control during the first mode makes the internal combustion engine more likely to be operated as the temperature of the coolant for the internal combustion engine falls.

In the control apparatus according to this aspect of the invention, the control portion may operate the internal combustion engine when a required power calculated by subtracting the required discharge amount from a power needed for running of the vehicle is larger than a first threshold in performing the intermittent control during the first mode, and stop the internal combustion engine when the required power is smaller than a second threshold smaller than the first threshold, and the calculation portion may calculate the required discharge amount as a value that decreases as the temperature of the internal combustion engine falls.

In the control apparatus according to this aspect of the invention, the control portion may continue to operate the internal combustion engine instead of stopping the internal combustion engine when a time during which the internal combustion engine continues to be operated is shorter than a predetermined time in a case where the internal combustion engine is in operation through the intermittent control during the first mode.

In the control apparatus according to this aspect of the invention, the calculation portion may calculate the required discharge amount on a basis of a temperature of the internal combustion engine and a cumulative operation time of the internal combustion engine during the first mode.

In the control apparatus according to this aspect of the invention, the calculation portion may calculate the required discharge amount such that the intermittent control during the first mode makes the internal combustion engine more likely to be operated as the temperature of the internal combustion engine falls and as the cumulative operation time decreases.

In the control apparatus according to this aspect of the invention, the vehicle may run in the first mode before a storage amount of the storage device becomes smaller than a lower limit, and may run in the second mode after the storage amount of the storage device becomes smaller than the lower limit, and the predetermined condition may be a condition that the internal combustion engine be operated to complete control for warming up the catalyst in response to a decrease in the storage amount of the storage device below an amount larger than the lower limit by a predetermined amount.

In the control apparatus according to this aspect of the invention, the vehicle may further include a generator that generates an electric power for charging the storage device with an aid of a motive power of the internal combustion engine, and the second mode may be a mode in which the internal combustion engine is so operated as to cause the generator to generate an electric power for holding the storage amount of the storage device within a predetermined range.

A second aspect of the invention relates to a control method for a vehicle that includes an internal combustion engine, a catalyst for purifying an exhaust gas of the internal combustion engine, a storage device capable of being charged with an electric power from a power supply outside the vehicle, and a rotational electrical machine driven with an aid of an electric power of the storage device, and that has, as running modes, a first mode in which the vehicle runs with an aid of a motive power of the rotational electrical machine with the internal combustion engine stopped in principle so as to give higher priority to consumption of the electric power of the storage device than to conservation thereof and a second mode in which the vehicle runs with an aid of a motive power of the internal combustion engine and a motive power of the rotational electrical machine with the internal combustion engine operated according to need so as to give higher priority to conservation of the electric power of the storage device than to consumption thereof. This control method includes performing intermittent control to intermittently operate the internal combustion engine in accordance with a required discharge amount, namely, an amount of an electric power to be discharged from the storage device even in the first mode when a predetermined condition on warm-up of the catalyst is fulfilled during the first mode, and calculating the required discharge amount on a basis of a temperature of the internal combustion engine when the intermittent control is performed during the first mode.

The control method according to this aspect of the invention may further include detecting a temperature of a coolant for the internal combustion engine, and calculating the required discharge amount such that the intermittent control during the first mode makes the internal combustion engine more likely to be operated as the temperature of the coolant for the internal combustion engine falls.

The control method according to this aspect of the invention may further include operating the internal combustion engine when a required power calculated by subtracting the required discharge amount from a power needed for running of the vehicle is larger than a first threshold, in performing the intermittent control during the first mode, stopping the internal combustion engine when the required power is smaller than a second threshold smaller than the first threshold, and calculating the required discharge amount as a value that decreases as the temperature of the internal combustion engine falls.

The control method according to this aspect of the invention may further include continuing to operate the internal combustion engine instead of stopping the internal combustion engine when a time during which the internal combustion engine continues to be operated is shorter than a predetermined time in a case where the internal combustion engine is in operation through the intermittent control during the first mode.

The control method according to this aspect of the invention may further include calculating the required discharge amount on a basis of a temperature of the internal combustion engine and a cumulative operation time of the internal combustion engine during the first mode.

The control method according to this aspect of the invention may further include calculating the required discharge amount such that the intermittent control during the first mode makes the internal combustion engine more likely to be operated as the temperature of the internal combustion engine falls and as the cumulative operation time decreases.

In the control method according to this aspect of the invention, the vehicle may run in the first mode before a storage amount of the storage device becomes smaller than a lower limit, and may run in the second mode after the storage amount of the storage device becomes smaller than the lower limit, and the predetermined condition may be a condition that the internal combustion engine be operated to complete control for warming up the catalyst in response to a decrease in the storage amount of the storage device below an amount larger than the lower limit by a predetermined amount.

According to the invention, in the plug-in hybrid vehicle, the emission purification performance during a transition from the first mode (the CD mode) to the second mode (the CS mode) can be ensured without causing a sense of incongruity to the user.

BRIEF DESCRIPTION OF THE DRAWINGS

The foregoing and further objects, features and advantages of the invention will become apparent from the following description of an example embodiment of the invention with reference to the accompanying drawings, wherein like numerals are used to represent like elements and wherein.

DETAILED DESCRIPTION OF EMBODIMENT

The embodiment of the invention will be described hereinafter with reference to the drawings. In the following description, like components are denoted by like reference symbols. Those components denoted by the same reference symbol are identical in name and function as well. Accordingly, no detailed description of those components will be repeated.

Figure 1:
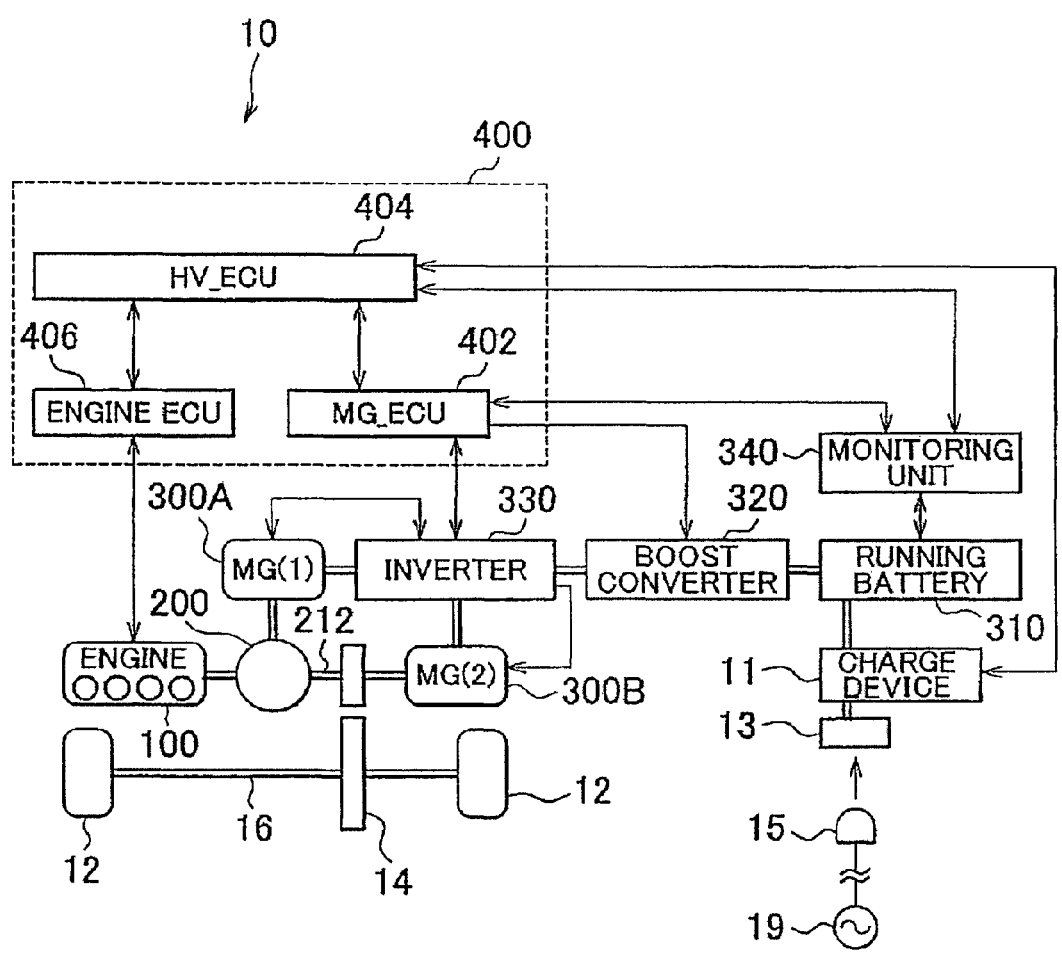
FIG. 1 is a view showing the structure of a vehicle mounted with an ECU according to the embodiment of the invention.

FIG. 1 is a view showing the structure of a vehicle 10 mounted with an electronic control unit (ECU) as a control apparatus according to the embodiment of the invention. The vehicle 10 is a so-called plug-in hybrid vehicle. That is, the vehicle 10 is a vehicle that runs with the aid of a motive power of at least one of an engine 100 and a second motor-generator (MG(2)) 300B, and has a running battery 310 that supplies an electric power to the MG(2) 300B or the like and can be charged with an electric power from an alternating-current power supply 19 outside the vehicle, such as a household power supply or the like.

In addition to the engine 100, the MG(2) 300B, and the running battery 310 as described above, the vehicle 10 includes a motive power split mechanism 200, a reducer 14, an inverter 330, a boost converter 320, an engine ECU 406, an MG_ECU 402, an HV_ECU 404, and the like.

The motive power split mechanism 200 is constituted by a planetary gear including a sun gear, a pinion gear, a carrier, and a ring gear. The motive power split mechanism 200 distributes a motive power generated by the engine 100 to an output shaft 212 and a first motor-generator (MG(1)) 300A. The engine 100, the MG(1) 300A, and the MG(2) 300B are coupled to one another via the motive power split mechanism 200. As a result, the respective rotational speeds of the engine 100, the MG(1) 300A, and the MG(2) 300B are related to one another such that when two of the rotational speeds are determined the other rotational speed is determined.

The reducer 14 transmits a motive power generated by the engine 100, the MG(1) 300A, and the MG(2) 300B to driving wheels 12, and transmits the driving of the driving wheels 12 to the engine 100, the MG(1) 300A, and the MG(2) 300B.

The inverter 330 performs current control while converting a direct current of the running battery 310 and alternating currents of the MG(1) 300A and the MG(2) 300B.

The boost converter 320 carries out voltage conversion between the running battery 310 and the inverter 330.

The engine ECU 406 controls the operation state of the engine 100. The MG_ECU 402 controls the charge/discharge states and the like of the MG(1) 300A, the MG(2) 300B, the inverter 330, and the running battery 310 in accordance with the state of the vehicle 10. The HV_ECU 404 mutually manages and controls the engine ECU 406, the MG_ECU 402, and the like, and controls the entire hybrid system such that the vehicle 10 can travel most efficiently.

Furthermore, the vehicle 10 includes a connector 13 for connecting thereto a paddle 15 connected to the alternating-current power supply 19, and a charge device 11 that converts an electric power from the alternating-current power supply 19, which is supplied via the connector 13, into a direct current and outputs the direct current to the running battery 310. The charge device 11 controls the amount of the electric power with which the running battery 10 is charged, in accordance with a control signal from the HV_ECU 404.

In FIG. 1, the respective ECU's are configured separately from one another. However, two or more of these ECU's may be configured as an integrated ECU. For example, as indicated by dotted lines in FIG. 1, the MG_ECU 402, the HV_ECU 404, and the engine ECU 406 may be designed as an integrated ECU 400. In the following description, the MG_ECU 402, the HV_ECU 404, and the engine ECU 406 will be described as the ECU 400 without being distinguished from one another.

Signals from a vehicle speed sensor (not shown), an accelerator opening degree sensor (not shown), a throttle opening degree sensor (not shown), an MG(1) rotational speed sensor (not shown); an MG(2) rotational speed sensor (not shown), an engine rotational speed sensor (not shown), and a monitoring unit 340 that monitors the state of the running battery 310 (a battery voltage value, a battery current value, a battery temperature, and the like) are input to the ECU 400.

When the MG(1) 300A or the MG(2) 300B is caused to function as a motor, the ECU 400 boosts a direct-current electric power discharged from the running battery 310 by means of the boost converter 320, converts the boosted direct-current electric power into an alternating-current electric power by means of the inverter 330, and supplies the alternating-current electric power to the MG(1) 300A and the MG(2) 300B.

On the other hand, in charging the running battery 310, the ECU 400 causes the MG(1) 300 to generate an electric power with the aid of a motive power of the engine 100 transmitted via the motive power split mechanism 200, or causes the MG(2) 300B to generate an electric power with the aid of a running energy of the vehicle transmitted via the reducer 14. The ECU 400 then converts an alternating-current electric power generated by the MG(1) 300A or the MG(2) 300B into a direct-current electric power by means of the inverter 330, lowers the direct-current electric power by means of the boost converter 320, and supplies the lowered direct-current electric power to the running battery 310.

Further, the ECU 400 can charge the running battery 310 by converting an alternating-current electric power from the alternating-current power supply 19 into a direct current by means of the charge device 11 and supplying the direct current to the running battery 310 as well.

Figure 2:
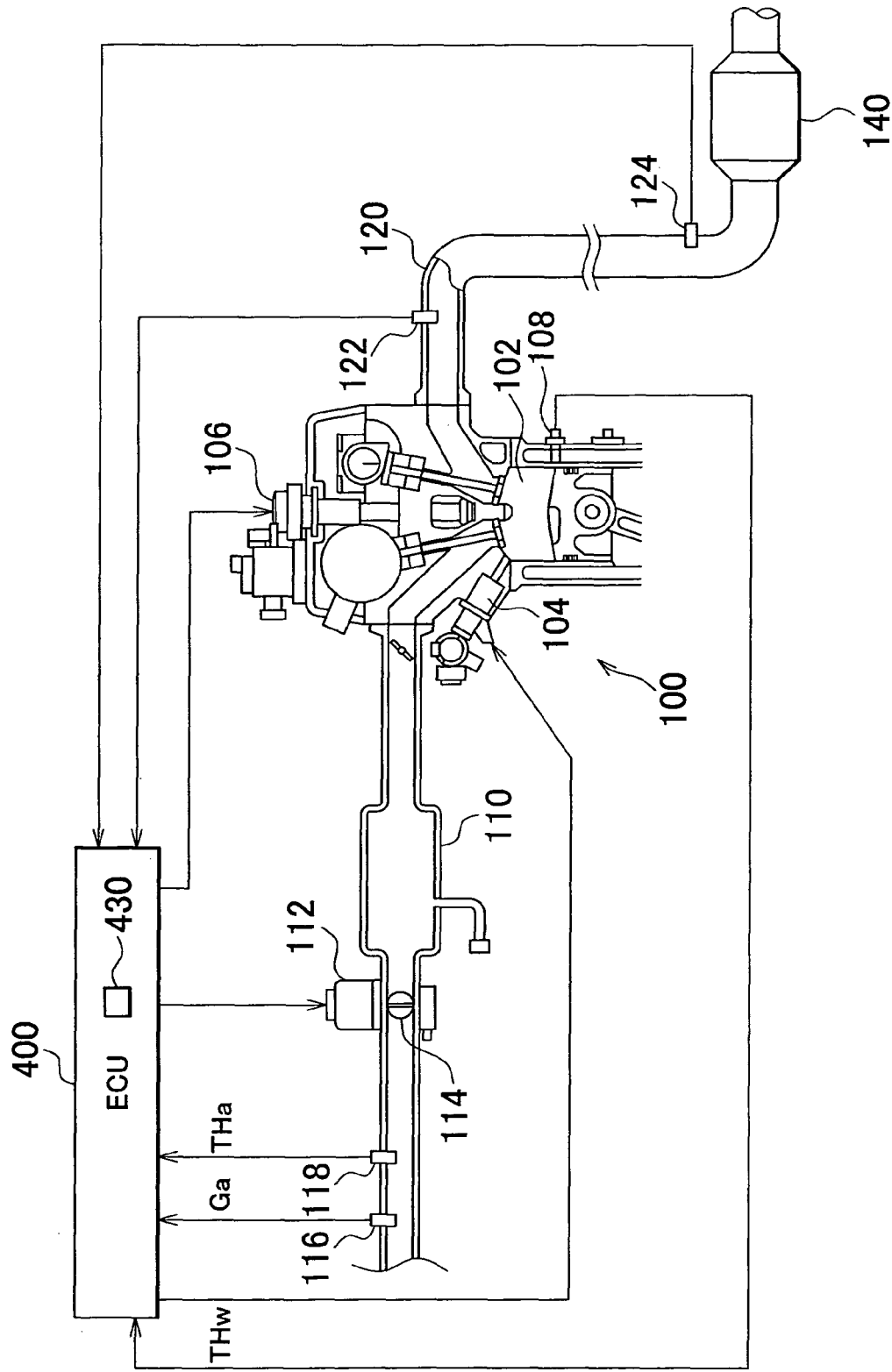
FIG. 2 is a view showing an engine according to the embodiment of the invention and peripheral components associated with the engine.

The engine 100 and peripheral components associated with the engine 100 will be described with reference to FIG. 2. In this engine 100, air sucked in from an air cleaner (not shown) flows through an intake pipe 110 and is introduced into a combustion chamber 102 of the engine 100. The amount of air introduced into the combustion chamber 102 is adjusted by an operation amount of a throttle valve 114 (a throttle opening degree). The throttle opening degree is controlled by a throttle motor 112 that operates on the basis of a signal from the ECU 400.

An injector 104 injects fuel stored in a fuel tank (not shown) into the combustion chamber 102. When energized, the injector 104 opens and injects fuel toward the combustion chamber 102. It should be noted that fuel may be injected into an intake passage from the injector 104.

The mixture of the air introduced from the intake pipe 110 and the fuel injected from the injector 104 is ignited to be burned with the aid of an ignition coil 106 that is controlled through a control signal from the ECU 400.

Exhaust gas generated after the combustion of the mixture is discharged to the atmosphere through a catalyst 140 across which an exhaust pipe 120 extends.

The catalyst 140 is a three-way catalyst that performs the treatment of purifying emission substances (noxious substances such as hydrocarbons, carbon monoxide, nitrogen oxides, and the like) contained in exhaust gas. The catalyst 140 promotes an oxidative reaction of hydrocarbons and carbon monoxide and a reductive reaction of nitrogen oxides. The catalyst 140 has the properties of decreasing in the capacity to promote the oxidative reaction and the reductive reaction (the capacity to purify exhaust gas) as the temperature of the catalyst 140 falls.

Signals from an engine coolant temperature sensor 108, an airflow meter 116, an intake air temperature sensor 118, an air-fuel ratio sensor 122, and an oxygen sensor 124 are input to the ECU 400. The engine coolant temperature sensor 108 detects a temperature of an engine coolant (an engine coolant temperature) THw. The airflow meter 116 detects an intake air amount (an amount of air sucked into the engine 100 per unit time) Ga. The intake air temperature sensor 118 detects a temperature of intake air (an intake air temperature) THa. The air-fuel ratio sensor 122 detects a ratio between air in exhaust gas and fuel. The oxygen sensor 124 detects a concentration of oxygen in exhaust gas. These respective sensors send signals indicating detection results to the ECU 400.

On the basis of the signals sent from the respective sensors and the like, the ECU 400 controls the ignition coil 106 such that an appropriate ignition timing is obtained, controls the throttle motor 112 such that an appropriate throttle opening degree is obtained, or controls the injector 104 such that an appropriate fuel injection amount is obtained.

Further, a storage portion 430 in which various pieces of information, programs, thresholds, maps, data on processing results of the ECU 400 and the like are stored is provided inside the ECU 400.

Next, running modes of the vehicle 10 will be described. The vehicle 10 is the plug-in hybrid vehicle as described above, and is designed to run using the electric power of the running battery 310 by priority.

The vehicle 10 has a charge depleting mode (a CD mode) and a charge sustain mode (a CS mode) as the running modes.

The CS mode is a mode in which the vehicle 10 runs with the aid of the motive power of both the MG(2) 300B and the engine 100 (hereinafter referred to as "HV running" as well). In the CS mode, since higher priority is given to the consumption of an electric power stored in the running battery 310 than to the conservation thereof, intermittent control for intermittently starting and stopping the engine 100 according to need is performed. More specifically, in the CS mode, the MG(1) 300A is caused to generate with the aid of the motive power of the engine 100 an electric power needed to hold a state of charge (SOC) indicating a storage amount of the running battery 31 within a predetermined range, and this electric power is supplied to the running battery 310.

On the other hand, the CD mode is a mode in which the vehicle 10 runs by priority with the aid of the motive power of the MG(2) 300B without using the motive power of the engine 100 (hereinafter referred to as "EV running" as well). In the CD mode, since higher priority is given to the consumption of an electric power of the running battery 310 than to the conservation thereof, EV running is carried out with the engine 100 stopped in principle. However, when later-described preliminary warm-up control or intermittent control after preliminary warm-up control is performed, the engine 100 is operated even in the CD mode. It should be noted that the engine 100 is operated also in the case where a driving force required by a user cannot be output through the motive power of the MG(2) 300B alone.

Figure 3:
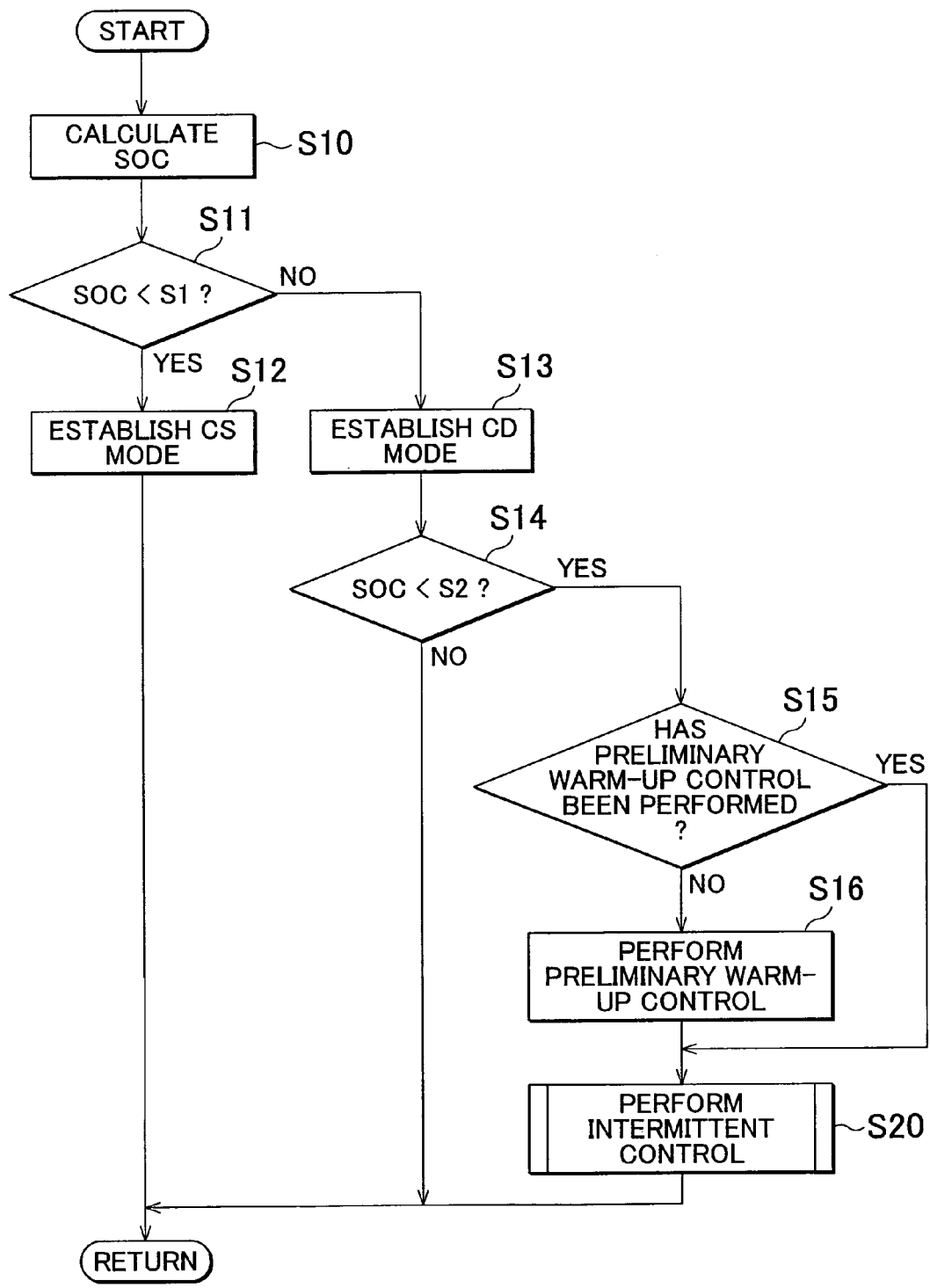
FIG. 3 is a processing flow (No. 1) of the ECU.

FIG. 3 is a processing flow of the ECU 400 in the case where the vehicle 10 is caused to run with one of the running modes, namely, the aforementioned CS mode and the aforementioned CD mode selected. This processing is repeatedly performed on a predetermined cycle. It should be noted that FIG. 3 is made on the premise that a driving force required by the user can be output through the motive power of the MG(2) 300B alone in the CD mode.

As shown in FIG. 3, the ECU 400 calculates an SOC of the running battery 310 on the basis of a signal from the monitoring unit 340 or the like (step (hereinafter abbreviated as "S") 10), and determines whether or not the SOC has decreased below a threshold S1 (S11).

The ECU 400 then causes the vehicle 10 to run in the CD mode until the SOC decreases below the threshold S1 (NO in S11) (S13). It should be noted that the threshold S1 is set as a very small value. That is, since the running battery 310 is charged with an electric power from the alternating-current power supply 19, which is very efficiently generated by an electric power company or the like, the ECU 400 gives priority to EV running until the electric power of the running battery 310 is almost depleted.

Furthermore, the ECU 400 determines whether or not the SOC is smaller than a threshold S2 (>S1) during the CD mode (S14). The threshold S2 is a value that makes a possible running distance in the CD mode until a transition to the CS mode (until the SOC decreases below the threshold S1) equal to a predetermined distance (e.g., about 5 km), and is set in advance through an experiment or the like.

When the SOC is smaller than the threshold S2 during the CD mode (YES in S14) and preliminary warm-up control has not been performed yet during the currently ongoing CS mode (NO in S15), the ECU 400 performs preliminary warm-up control for a predetermined time (S16). Preliminary warm-up control is performed to warm up the engine 100 and the catalyst 140 in advance in preparation for a transition to the CS mode. In preliminary warm-up control, the engine 100 is started even in the CD mode. As a result, the engine 100 is warmed up, and the catalyst 140 is warmed up by exhaust gas from the engine 100. After the lapse of a predetermined time from the start of preliminary warm-up control, preliminary warm-up control is completed to stop the engine 100 again. It should be noted that preliminary warm-up control is not performed when preliminary warm-up control has been performed during the currently ongoing CS mode (YES in S15).

In order to prevent the temperature of the catalyst 140 from decreasing again after preliminary warm-up control, the ECU 400 performs intermittent control to intermittently start and stop the engine 100 as in the CS mode even during the CD mode after preliminary warm-up control (S20).

After that, as soon as the SOC decreases below the threshold S1 (YES in S11), the ECU 400 makes a transition in the running mode from the CD mode to the CS mode to perform the intermittent control of the engine 100 (S12). During this transition to the CS mode, since the engine 100 and the catalyst 140 have been warmed up in advance through the aforementioned processing of S16 (preliminary warm-up control) or the aforementioned processing of S20 (intermittent control), the emission purification performance is sufficiently ensured.

Thus, in this embodiment of the invention, the intermittent control of the engine 100 is performed not only during the CS mode but also after preliminary warm-up control during the CD mode.

Figure 4:
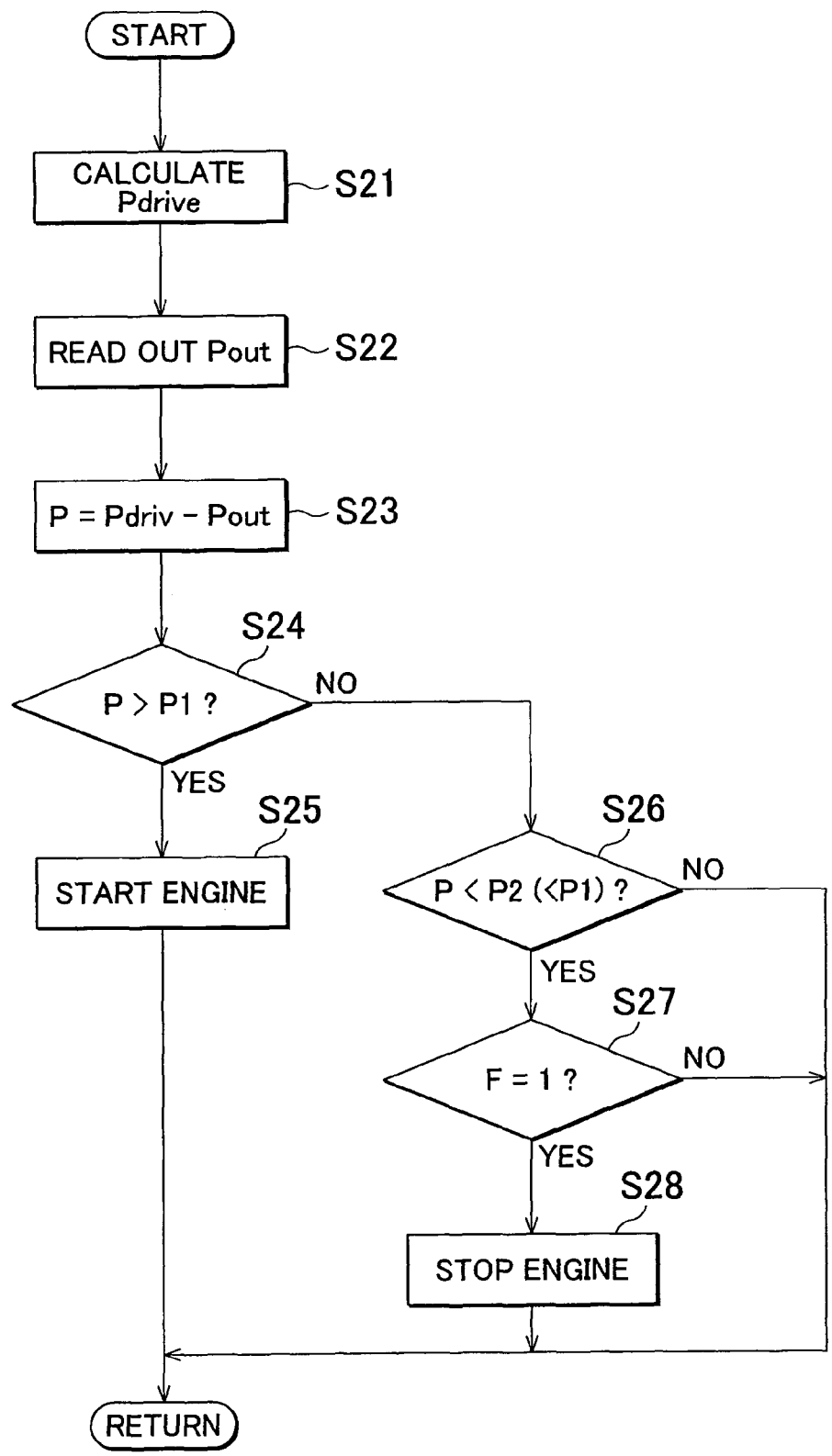
FIG. 4 is a processing flow (No. 2) of the ECU.

FIG. 4 is a processing flow of the ECU 400 in the case where the intermittent control of the engine 100 (the processing of S20 in FIG. 3) is performed after preliminary warm-up control during the CD mode.

The ECU 400 calculates a drive power Pdrive using a map adopting, for example, an accelerator opening degree and a vehicle speed as parameters (S21). The drive power Pdrive is an energy needed to cause the vehicle 10 to run with a driving force required by a driver.

The ECU 400 reads out a required discharge amount Pout stored in the storage portion 430 (S22). The required discharge amount Pout is an amount of an electric power to be discharged from the running battery 310. When the required discharge amount Pout assumes a positive value, it is meant that the electric power corresponding in amount to the absolute value of the required discharge amount Pout is to be discharged from the running battery 310. On the other hand, when the required discharge amount Pout assumes a negative value, it is meant that the running battery 310 is to be charged with the electric power corresponding in amount to the absolute value of the required discharge amount Pout.

The required discharge amount Pout is calculated in advance through another processing by the ECU 400 and then stored into the storage portion 430. The required discharge amount Pout is calculated according to a method that differs depending on whether the CD mode or the CS mode is established. In the CS mode, the required discharge amount Pout is calculated mainly on the basis of the SOC of the running battery 310. On the other hand, in the CD mode, the required discharge amount Pout is calculated through a later-described processing of S116 in FIG. 6. This will be described later in detail.

As indicated by an expression (1) shown below, the ECU 400 calculates as a required power P a value obtained by subtracting the required discharge amount Pout from the drive power Pdrive (S23).

$$\text{Required Power } P = (\text{Drive Power } Pdrive) - (\text{Required Discharge Amount } Pout) \quad \text{Expression (1)}$$

When the required power P is larger than a threshold P1 (YES in S24), the ECU 400 then starts the engine 100 (S25). It should be noted that the operation of the engine 100 is continued when the engine 100 is already in operation.

On the other hand, when the required power P is smaller than a threshold P2 (NO in S24, YES in S26), the ECU 400 stops the engine 100 on the condition that an engine stop permission flag F be "1" (the stop of the engine be permitted) (YES in S27, S28). The threshold P2 is set smaller than the threshold P1 to ensure a hysteresis between the start and stop of the engine 100. It should be noted that the threshold P2 may be set equal to the threshold P1.

Even in the case where the required power P is smaller than the threshold P2 (YES in S26), when the engine stop permission flag F is "0" (the stop of the engine 100 is prohibited) (NO in S27), the processing of stopping the engine 100 (the processing of S28) is not performed.

The engine stop permission flag F is a value set to either "1" or "0" by the ECU 400, and initially assumes "1". The setting of the engine stop permission flag F will be described later in detail.

As described above, in intermittent control during the CD mode, the engine 100 is started and stopped as a result of a comparison between the required power P and the thresholds P1 and P2. Since the required power P is a value obtained by subtracting the required discharge amount Pout from the drive power Pdrive, the start and stop of the engine 100 are adjusted in accordance with the values of the drive power Pdrive and the required discharge amount Pout.

Meanwhile, as described above, in this embodiment of the invention, even during the CD mode in which priority is given to EV running, the intermittent control of the engine 100 is performed as during the CS mode after preliminary warm-up control. Thus, the temperature of the catalyst 140 that has risen through preliminary warm-up control is prevented from falling again. As a result, the emission purification performance is sufficiently ensured even when a transition to the CS mode is made afterwards.

However, the amount of the electric power discharged from the running battery 310 decreases due to the performance of the intermittent control of the engine 100 during the CD mode. Therefore, the actual running distance in the CD mode is longer than a distance recognized by the user. As a result, the user feels a sense of incongruity.

It should be noted that although a transition to the CS mode can be made as soon as preliminary warm-up control is performed during the CD mode, the running distance in the CD mode then turns out to be too short and the electric power of the battery as a feature of the plug-in hybrid vehicle cannot be used by priority.

Thus, in this embodiment of the invention, when intermittent control is performed during the CD mode, the required discharge amount Pout is calculated on the basis of the engine coolant temperature THw, which is correlated with the temperature of the engine 100 and the temperature of the catalyst 140. The start and stop of the engine 100 in intermittent control during the CD mode are thereby adjusted in accordance with the temperature of the engine 100 and the temperature of the catalyst 140.

Figure 5:
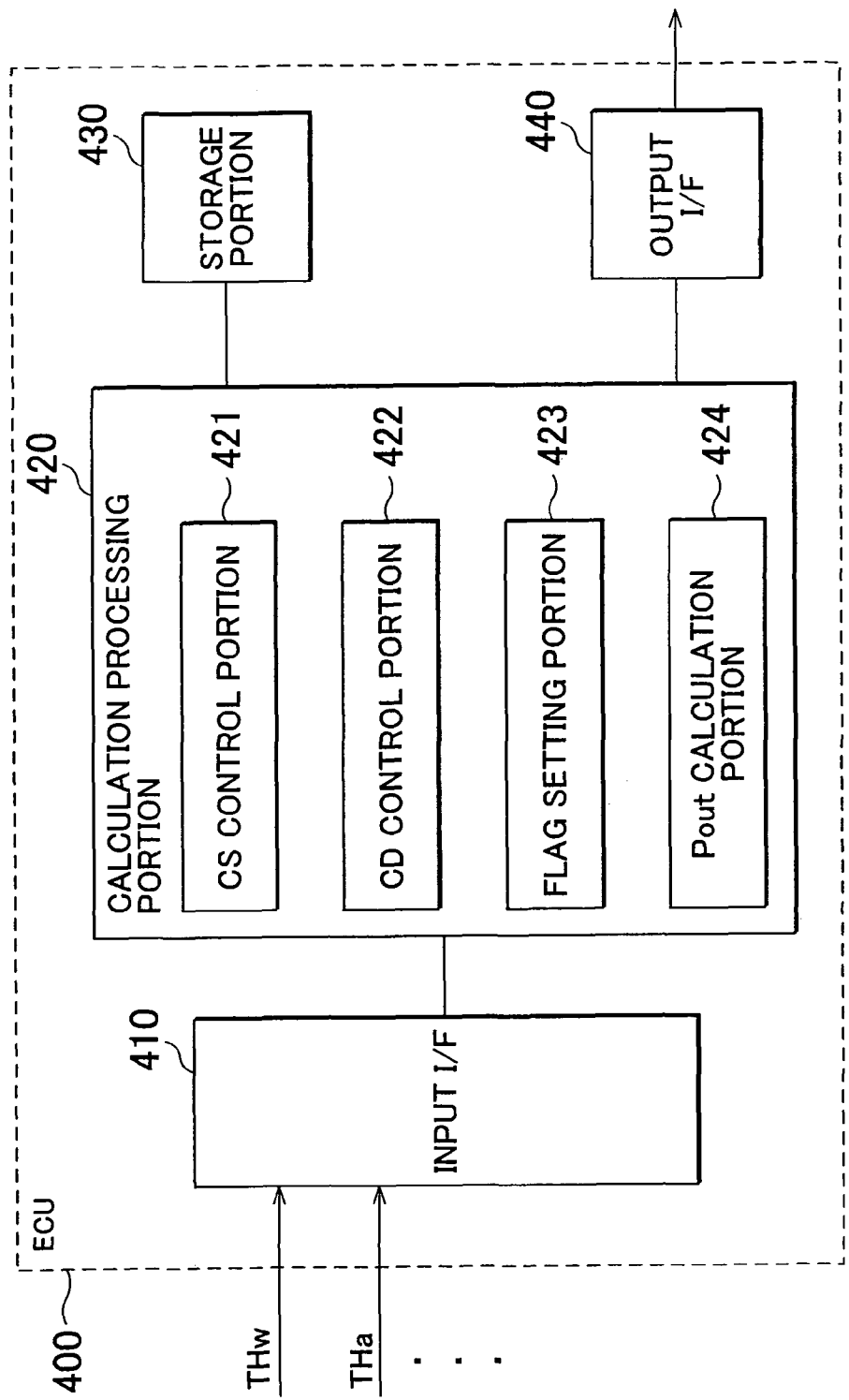
FIG. 5 is a functional block diagram of the ECU.

FIG. 5 shows a functional block diagram of the ECU 400. The ECU 400 includes an input interface 410 that receives information from the respective sensors and the like, the aforementioned storage portion 430, a calculation processing portion 420 that performs a calculation processing on the basis of the information from the input interface 410 and the storage portion 430, and an output interface 440 that outputs a processing result of the calculation processing portion 420 to respective components.

The calculation processing portion 420 includes a CS control portion 421, a CD control portion 422, a flag setting portion 423, and a Pout calculation portion 424.

The CS control portion 421 performs the control of causing the vehicle 10 to run in the CS mode when the SOC has decreased below the threshold S1 (the processing of S12 in FIG. 3). The CD control portion 422 performs the control of causing the vehicle 10 to run in the CD mode until the SOC decreases below the threshold S1 (the processings of S13 to S20 in FIG. 3 and the processings of FIG. 4). It should be noted that the details of the processings of the CS control portion 421 and the CD control portion 422 have already been described with reference to FIGS. 3 and 4.

The flag setting portion 423 sets "the engine stop permission flag F", which is used by the CD control portion 422 in performing intermittent control during the CD mode. More specifically, the flag setting portion 423 calculates "an engine operation time Tdrive" indicating a time during which the engine 100 is continuously in operation during intermittent control in the CD mode. When this engine operation time Tdrive is shorter than a predetermined criterial time, the flag setting portion 423 sets the engine stop permission flag F to "0" to prohibit the engine stop control during intermittent control in the CD mode (the processing of S28 in FIG. 4). On the other hand, when the engine operation time Tdrive is longer than the criterial time, the flag setting portion 423 sets the engine stop permission flag F to "1" to permit the engine stop control during intermittent control in the CD mode (the processing of S28 in FIG. 4). Every time the engine stop permission flag F is changed, it is stored into the storage portion 430 and used in the control performed by the CD control portion 422 (the processing of S27 in FIG. 4).

Further, the flag setting portion 423 calculates "the criterial time" to be compared with the engine operation time Tdrive on the basis of the engine coolant temperature THw. The flag setting portion 423 sets the criterial time relatively long (e.g., 3 seconds) when the engine coolant temperature THw is lower than a predetermined temperature (e.g., about 70° C.), and otherwise sets the criterial time relatively short (e.g., about 1 second). It should be noted that the method of setting the criterial time is not limited to this method, and that the criterial time may be a fixed value.

The Pout calculation portion 424 calculates "the required discharge amount Pout", which is used at the time of intermittent control during the CD mode by the CD control portion 422, on the basis of the engine coolant temperature THw. More specifically, the Pout calculation portion 424 reduces the required discharge amount Pout as the engine coolant temperature THw falls (as the temperature of the catalyst 140 is estimated to fall) (see FIG. 7, which will be described later). Every time the required discharge amount Pout is changed, it is stored into the storage portion 430 and is used in the control performed by the CD control portion 422 (the processing of S22 in FIG. 4).

The aforementioned function may be realized through software or hardware.

Figure 6:
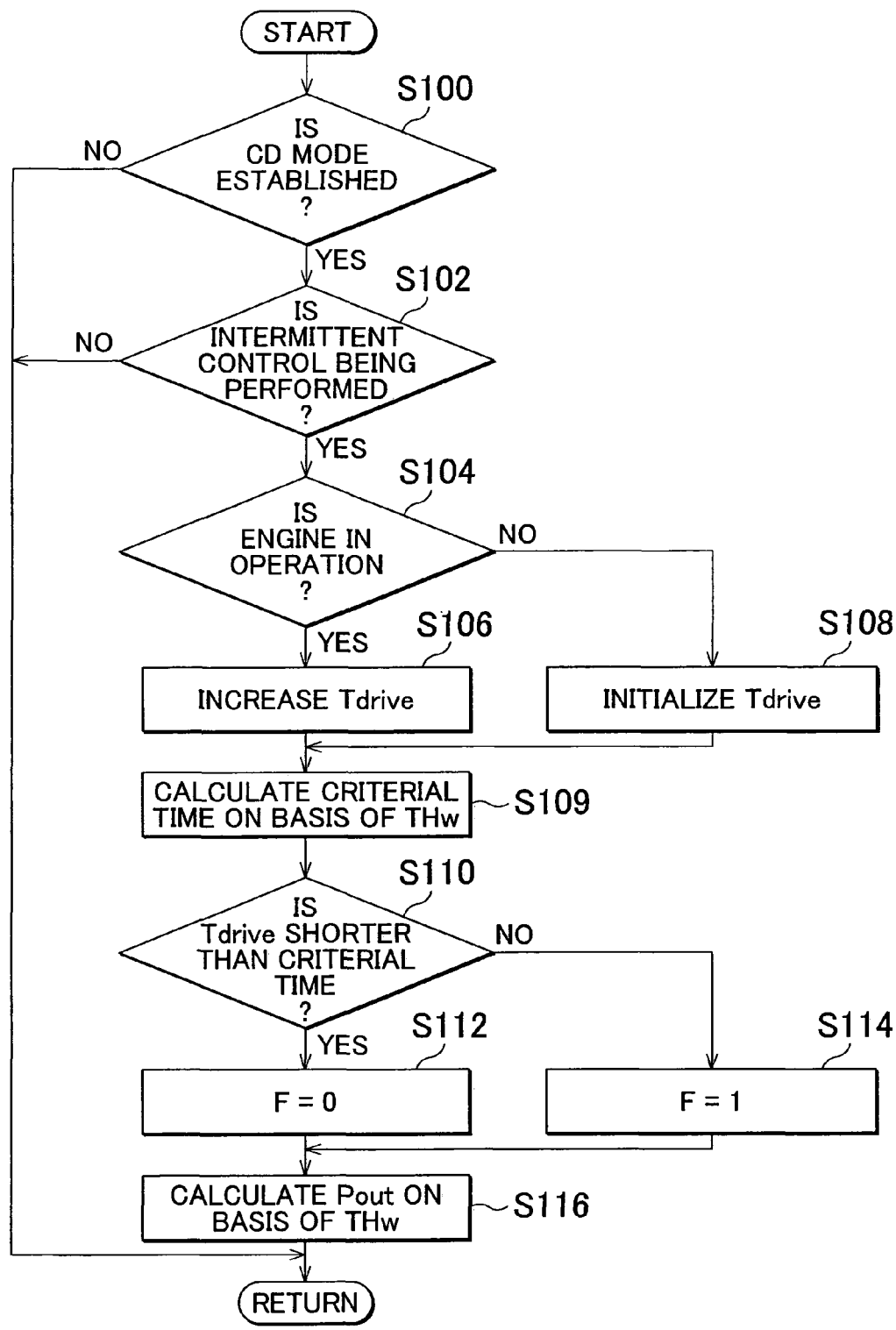
FIG. 6 is a processing flow (No. 3) of the ECU.

FIG. 6 is a processing flow of the ECU 400 in the case where the functions of the aforementioned flag setting portion 423 and the aforementioned Pout calculation portion 424 are realized through software. It should be noted that this processing is repeatedly performed on a predetermined cycle.

In S100, the ECU 400 determines whether or not the current running mode is the CD mode. When it is determined that the current running mode is the CD mode (YES in S100), the processing is shifted to S102. When it is determined that the current running mode is not the CD mode (NO in S100), the processing is terminated.

In S102, the ECU 400 determines whether or not intermittent control is being performed after preliminary warm-up control (the processings of S20 in FIG. 3 and the processings of FIG. 4 are being performed). When it is determined in this processing that intermittent control is being performed after preliminary warm-up control (YES in S102), the processing is shifted to S104. When it is determined that intermittent control is not being performed after preliminary warm-up control (NO in S102), the processing is terminated.

In S104, the ECU 400 determines whether or not the engine 100 is actually operated through intermittent control. When it is determined in this processing that the engine 100 is actually operated (YES in S104), the processing is shifted to S106. When it is determined that the engine 100 is not actually operated (NO in S104), the processing is shifted to S108.

In S106, the ECU 400 increases the engine operation time Tdrive by a predetermined time. As described above, this engine operation time Tdrive represents a time during which the engine 100 is in continuous operation during intermittent control after preliminary warm-up control, and assumes "0" as an initial value. Further, every time the engine operation time Tdrive is changed, it is stored into the storage portion 430.

In S108, the ECU 400 initializes the engine operation time Tdrive. That is, the ECU 400 sets the engine operation time Tdrive to the initial value "0".

In S109, the ECU 400 calculates a criterial time on the basis of the engine coolant temperature THw. This criterial time is used in the subsequent processing of S110. For example, as described above, the ECU 400 sets the criterial time relatively long (e.g., about 3 seconds) when the engine coolant temperature THw is lower than the predetermined temperature, and otherwise sets the criterial time relatively short (e.g., about 1 second).

In S110, the ECU 400 determines whether or not the engine operation time Tdrive is shorter than the criterial time. When an affirmative determination is made in this processing (YES in S110), the processing is shifted to S112. Otherwise (NO in S110), the processing is shifted to S114.

In S112, the ECU 400 sets the engine stop permission flag to "0". Thus, the engine stop processing during intermittent control in the CD mode (the processing of S28 in FIG. 4) is prohibited.

In S114, the ECU 400 sets the engine stop permission flag to "1". Thus, the engine stop processing during intermittent control in the CD mode (the processing of S28 in FIG. 4) is permitted.

In S116, the ECU 400 calculates the required discharge amount Pout in accordance with the engine coolant temperature THw. For example, the ECU 400 calculates the required discharge amount Pout on the basis of a map adopting the engine coolant temperature THw as a parameter as shown in FIG. 7.

Figure 7:
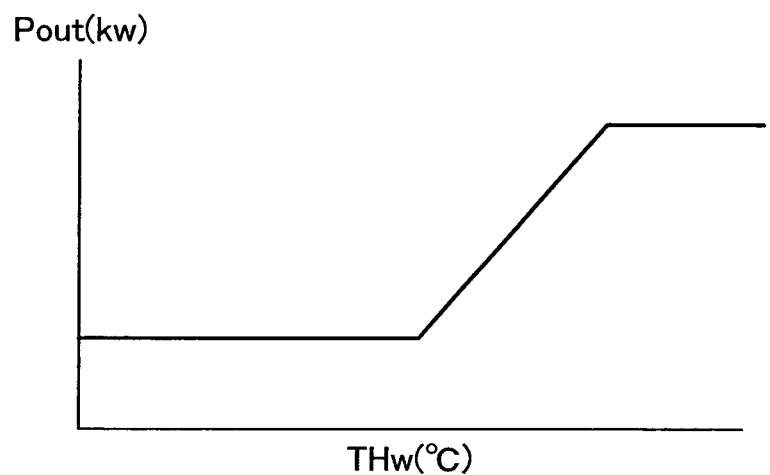
FIG. 7 is a map showing a relationship between an engine coolant temperature and a required discharge amount.

In the map shown in FIG. 7, in a range where the engine coolant temperature THw is high, the required discharge amount Pout is set to a relatively large positive value. In a range where the engine coolant temperature THw is low, the required discharge amount Pout is limited to a relatively small positive value. It should be noted that the map shown in FIG. 7 is merely an example and is not intended to limit the invention. It should be noted that every time the required discharge amount Pout is changed, it is stored into the storage portion 430.

The operation of the ECU 400 based on the aforementioned structure and flowcharts will be described.

When the engine coolant temperature THw is low during intermittent control in the CD mode, the temperature of the catalyst 140 raised through preliminary catalyst warm-up control has fallen again, and it is considered that the emission purification performance is not sufficiently ensured.

Thus, in the range where the engine coolant temperature THw is low, the ECU 400 limits the required discharge amount Pout to a relatively small value even when the SOC of the running battery 310 still has not reached its maximum (see FIG. 7). By thus limiting the required discharge amount Pout to the small value, the required power P is made likely to assume a large value (see the aforementioned expression (1)), and to exceed the threshold P1 in intermittent control during the CD mode (the result of the determination of S24 in FIG. 4 is made likely to be YES). Thus, the start of the engine 100 (the processing of S25 in FIG. 4) becomes likely to be carried out. As a result, in intermittent control during the CD mode, the engine 100 can be positively started with higher priority given to the warm-up of the catalyst 140 than to EV running.

On the other hand, when the engine coolant temperature THw is high, the temperature of the catalyst 140 is also high, and it is considered that the emission purification performance is already ensured to some extent.

Thus, in the range where the engine coolant temperature THw is high, the ECU 400 sets the required discharge amount Pout relatively large without imposing any limit thereon (see FIG. 7). By thus setting the required discharge amount Pout large, the required power P is made likely to assume a small value (see the aforementioned expression (1)), and to decrease below the threshold P2 in intermittent control during the CD mode (the result of the determination of S26 in FIG. 4 is made likely to be YES). Thus, the stop of the engine 100 (the processing of S28 in FIG. 4) becomes likely to be carried out. As a result, in intermittent control during the CD mode, the time for performing EV running as running intrinsic to the CD mode is ensured, and the SOC decreases at a rate close to an intrinsic rate of decrease. Therefore, the discrepancy between the actual running distance in the CD mode and the distance recognized by the user becomes small, and the sense of incongruity caused to the user is lessened.

Figure 8:
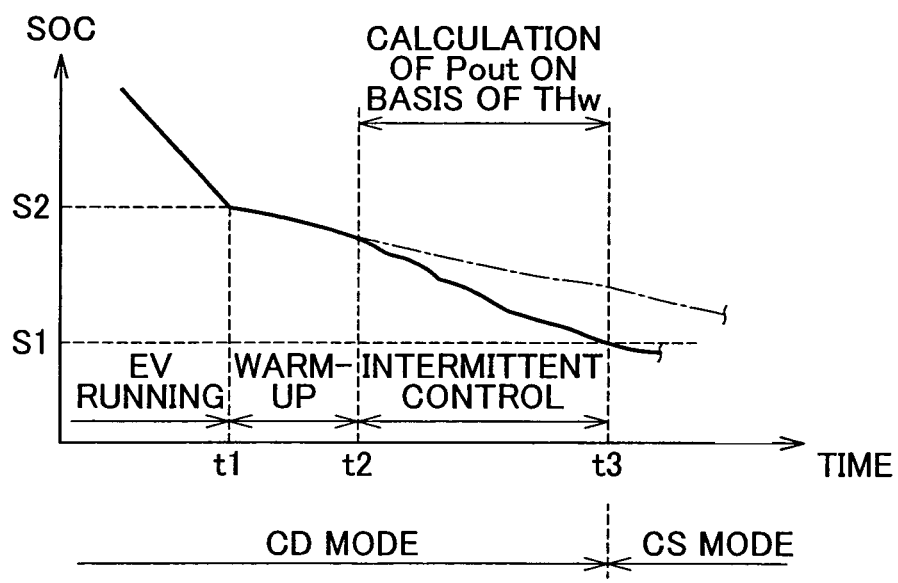
FIG. 8 is a timing chart of an SOC.

FIG. 8 shows a timing chart of the SOC before and after a transition from the CD mode to the CS mode. Before a time t1, namely, when the SOC is larger than the threshold S2, EV running is carried out by priority in the CD mode. When the SOC decreases below the threshold S2 at the time t1, the engine 100 is continuously operated for a predetermined time through preliminary warm-up control.

While the SOC decreases below the threshold S1 after the completion of preliminary warm-up control (between a time t2 and a time t3), the intermittent control of the engine 100 is performed even in the CD mode. During intermittent control in this CD mode, the required discharge amount Pout is calculated on the basis of the engine coolant temperature THw. Therefore, the start and stop of the engine 100 are adjusted in accordance with the temperature of the catalyst 140. Thus, the prevention of a fall in the temperature of the catalyst 140 and the securement of the time for EV running are made compatible with each other. Therefore, a delay of the decrease in the SOC as indicated by alternate long and short dash lines in FIG. 8 can be prevented while ensuring the emission purification performance. As a result, the emission purification performance during a transition from the CD mode to the CS mode can be ensured without causing a sense of incongruity to the user.

Furthermore, the ECU 400 calculates the engine operation time Tdrive indicating the time during which the engine 100 is in continuous operation during intermittent control in the CD mode (S106), and sets the engine stop permission flag F to "0" to prohibit the engine stop processing (the processing of S28 in FIG. 4) when the engine operation time Tdrive is shorter than the criterial time (YES in S110). Thus, the start of the engine 100 is prevented from being repeated in a short time shorter than the criterial time.

In general, the amount of fuel injection is increased in starting the engine. However, when this start of the engine accompanied by the increase in the amount of fuel is repeated at short time intervals, the amount of oxygen in exhaust gas becomes insufficient and the emission purification performance of the catalyst is deteriorated by contrast. In this embodiment of the invention, the start of the engine 100 is prevented from being repeated at short time intervals as described above. Therefore, the occurrence of such a problem can be prevented in advance.

Furthermore, the ECU 400 sets the criterial time, which is to be compared with the engine operation time Tdrive, in accordance with the engine coolant temperature THw (S109). That is, when the engine coolant temperature THw is lower than the predetermined temperature, the criterial time is set relatively long. Thus, when the engine coolant temperature THw is low, the engine stop permission flag F is likely to be set to "0", and the engine 100 is unlikely to be stopped. Therefore, the time from the start of the engine 100 to the stop of the engine 100 is further prolonged. Thus, the emission performance of the catalyst 140 can be more positively prevented from deteriorating.

As described above, during intermittent control in the CD mode, the ECU 400 calculates the required discharge amount Pout in accordance with the engine coolant temperature, thereby adjusting the conditions for starting and stopping the engine during intermittent control in the CD mode in accordance with the temperature of the catalyst. That is, since it is considered that the emission purification performance is not ensured when the engine coolant temperature is low, the ECU 400 limits the required discharge amount Pout to a small value to give higher priority to the warm-up of the catalyst than to EV running, thereby making the engine likely to be started. On the other hand, since it is considered that the emission purification performance is ensured when the engine coolant temperature is high, the ECU 400 sets the required discharge amount Pout large without imposing any limit thereon to give higher priority to EV running than to the warm-up of the catalyst, thereby making the engine likely to be stopped. Thus, the securement of the EV running time during intermittent control in the CD mode and the warm-up of the catalyst can be made compatible with each other. As a result, in the plug-in hybrid vehicle, the emission purification performance during a transition from the CD mode to the CS mode can be ensured without causing a sense of incongruity to the user.

It should be noted that this embodiment of the invention can also be modified, for example, as follows. In this embodiment of the invention, the engine coolant temperature THw is used as the parameter for calculating the criterial time and the required discharge amount Pout in the processings of S109 and S116 in FIG. 6. However, the invention should not be limited to this example. That is, another parameter correlated to the temperature of the engine and the temperature of the catalyst may be used instead of or in addition to the engine coolant temperature THw.

Figure 9:
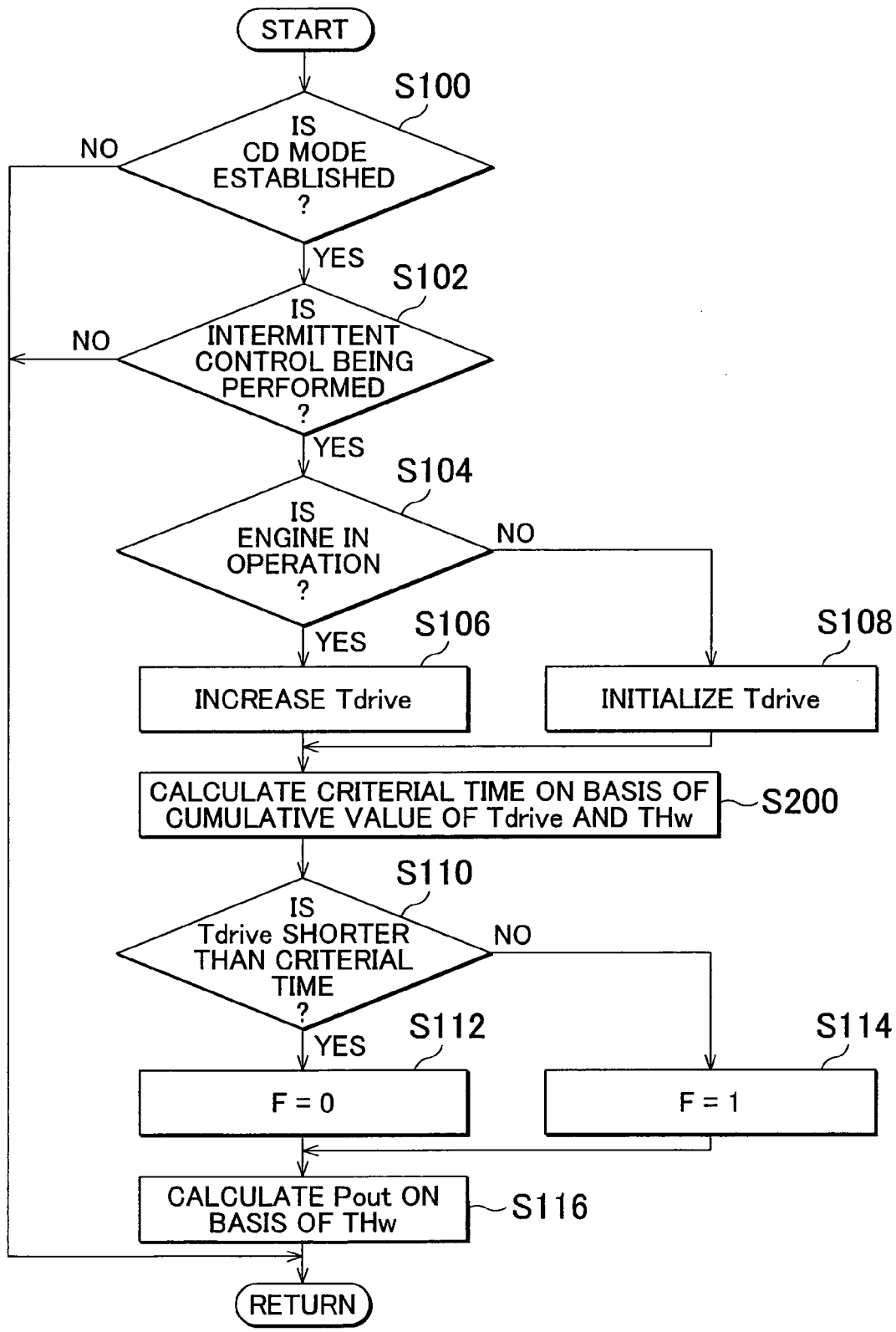
FIG. 9 is a processing flow (No. 4) of the ECU.

For example, "a cumulative value of the engine operation time Tdrive (a cumulative operation time of the engine 100 after the start of intermittent control in the CD mode)" may be used as another parameter for calculating the criterial time. That is, as indicated by S200 in FIG. 9, the criterial time may be calculated on the basis of two parameters, namely, the cumulative value of the engine operation time Tdrive and the engine coolant temperature THw. In this case, the emission purification performance is considered to be ensured less sufficiently as the cumulative value of the engine operation time Tdrive decreases and as the engine coolant temperature THw falls. It is therefore appropriate to set the criterial time long. It should be noted that the steps other than S200 shown in FIG. 9 are identical to the steps denoted by the same numbers shown in the aforementioned FIG. 6 respectively.

Further, in this embodiment of the invention, the start of the engine is directly prohibited from being repeated at short time intervals by causing the engine stop permission flag F to reflect the engine operation time Tdrive in the processings of S100, S112, and S114 in FIG. 6. However, the invention should not be limited to this example. For example, the start of the engine may be indirectly restricted from being repeated at short time intervals by causing the required discharge amount Pout to reflect the engine operation time Tdrive.

Figure 10:
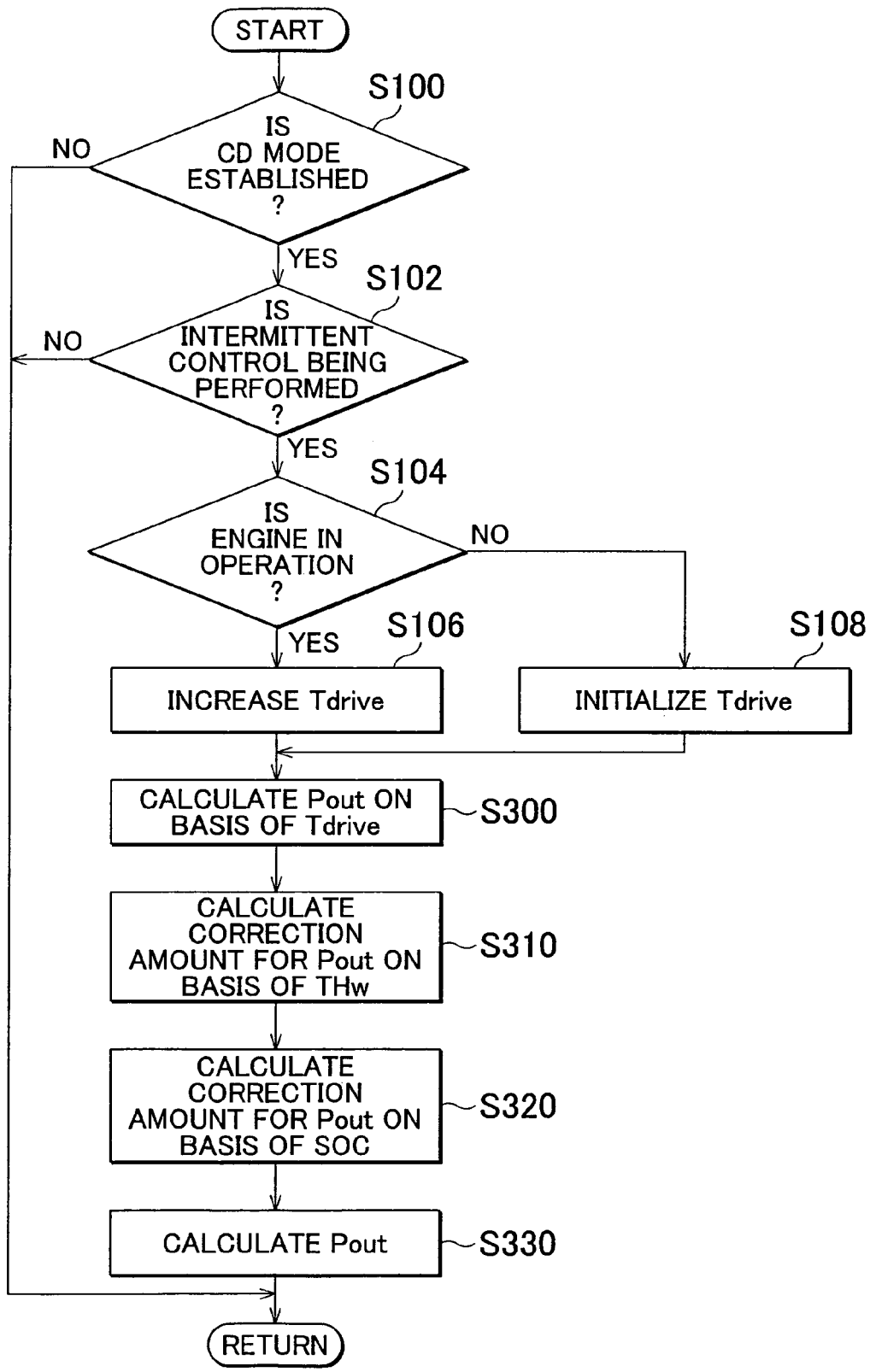
FIG. 10 is a processing flow (No. 5) of the ECU.

FIG. 10 shows an example of a processing flow of the ECU 400 in the case where the engine operation time Tdrive is reflected not by the engine stop permission flag F but by the required discharge amount Pout. It should be noted that the steps from S100 to S108 shown in FIG. 10 are identical to the steps denoted by the same numbers shown in the aforementioned FIG. 6 respectively.

Figure 11:
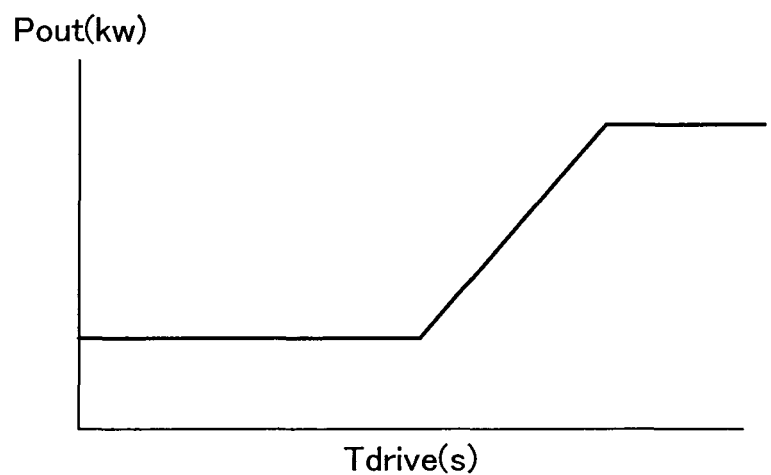
FIG. 11 is a map showing a relationship between an engine operation time and the required discharge amount.

In S300, the ECU 400 calculates the required discharge amount Pout on the basis of the engine operation time Tdrive. As shown in FIG. 11, in the range where the engine operation time Tdrive is short, the ECU 400 sets the required discharge amount Pout small. Thus, the required power P assumes a large value, and a determination that the required power P is larger than P1 is likely to be made continuously in the processing of S24 in FIG. 4. Therefore, the operation of the engine 100 is likely to be continued.

In S310, the ECU 400 calculates a correction amount for the required discharge amount Pout on the basis of the engine coolant temperature THw. As shown in the aforementioned FIG. 7, the ECU 400 calculates the correction amount for the required discharge amount Pout such that the required discharge amount Pout becomes small in the range where the engine coolant temperature THw is low.

Figure 12:
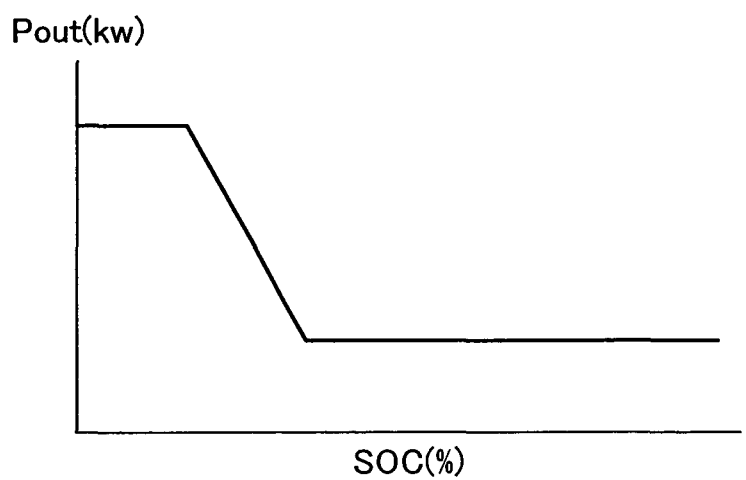
FIG. 12 is a map showing a relationship between the SOC and the required discharge amount.

In S320, the ECU 400 calculates the correction amount for the required discharge amount Pout on the basis of the SOC. The ECU 400 calculates the correction amount for the required discharge amount Pout such that the required discharge amount Pout becomes large in the range where the SOC is small (the range where a transition to the CS mode is to be made soon) as shown in FIG. 12. Thus, priority is given to EV running and a transition to the CS mode is accelerated. Therefore, the discrepancy between the possible running distance in the CD mode, which is recognized by the user, and the running distance in the CD mode decreases, and a sense of incongruity caused to the user is suppressed. It should be noted that the map shown in FIG. 12 is merely an example and that the invention should not be limited to this example. For example, when the SOC is large (when there is plenty of time until a transition to the CS mode), the correction amount for the required discharge amount Pout may be calculated so as to increase the required discharge amount Pout with a view to giving priority to EV running.

In S330, the ECU 400 corrects the required discharge amount Pout calculated in S300 with the correction amount calculated in S310 and S320. Thus, the required discharge amount Pout assumes a value taking the engine operation time Tdrive, the engine coolant temperature THw, and the SOC into account.

As described above, by causing the required discharge amount Pout to reflect two or more of the three parameters, namely, the engine operation time Tdrive, the engine coolant temperature THw, and the SOC as well, the securement of the EV running time during intermittent control in the CD mode and the warm-up of the catalyst can be made compatible with each other in an appropriate manner.

While the embodiment of the invention has been illustrated above, it is to be understood that the invention is not limited to details of the illustrated embodiment, but may be embodied with various changes, modifications or improvements, which may occur to those skilled in the art, without departing from the scope of the invention.

The invention claimed is:

1. A control apparatus for a vehicle that includes an internal combustion engine, a catalyst for purifying an exhaust gas of the internal combustion engine, a storage device charged with an electric power from a power supply outside the vehicle, and a rotational electrical machine driven by an electric power of the storage device, and that has, as running modes, a first mode in which the vehicle runs with an aid of a motive power of the rotational electrical machine with the internal combustion engine stopped in principle so as to give higher priority to consumption of the electric power of the storage device than to conservation thereof and a second mode in which the vehicle runs with an aid of a motive power of the internal combustion engine and a motive power of the rotational electrical machine with the internal combustion engine operated according to need so as to give higher priority to conservation of the electric power of the storage device than to consumption thereof, comprising:
a control portion that performs intermittent control to intermittently operate the internal combustion engine in accordance with a required discharge amount, namely, an amount of an electric power to be discharged from the storage device even in the first mode when a predetermined condition on warm-up of the catalyst is fulfilled during the first mode; and
a calculation portion that calculates the required discharge amount on a basis of a temperature of the internal combustion engine when the intermittent control is performed during the first mode.

2. The control apparatus according to claim 1, wherein the vehicle further includes a sensor that detects a temperature of a coolant for the internal combustion engine, and the calculation portion calculates the required discharge amount such that the intermittent control during the first mode makes the internal combustion engine more likely to be operated as the temperature of the coolant for the internal combustion engine falls.

3. The control apparatus according to claim 1,
wherein the control portion operates the internal combustion engine when a required power calculated by subtracting the required discharge amount from a power needed for running of the vehicle is larger than a first threshold in performing the intermittent control during the first mode, and stops the internal combustion engine when the required power is smaller than a second threshold smaller than the first threshold, and the calculation portion calculates the required discharge amount as a value that decreases as the temperature of the internal combustion engine falls.

4. The control apparatus according to claim 1,
wherein the control portion continues to operate the internal combustion engine instead of stopping the internal combustion engine when a time during which the internal combustion engine continues to be operated is shorter than a predetermined time in a case where the internal combustion engine is in operation through the intermittent control during the first mode.

5. The control apparatus according to claim 1,
wherein the calculation portion calculates the required discharge amount on a basis of a temperature of the internal combustion engine and a cumulative operation time of the internal combustion engine during the first mode.

6. The control apparatus according to claim 5,
wherein the calculation portion calculates the required discharge amount such that the intermittent control during the first mode makes the internal combustion engine more likely to be operated as the temperature of the internal combustion engine falls and as the cumulative operation time decreases.

7. The control apparatus according to claim 1,
wherein the vehicle runs in the first mode before a storage amount of the storage device becomes smaller than a lower limit, and runs in the second mode after the storage amount of the storage device becomes smaller than the lower limit, and
the predetermined condition is a condition that the internal combustion engine be operated to complete control for warming up the catalyst in response to a decrease in the storage amount of the storage device below an amount larger than the lower limit by a predetermined amount.

8. The control apparatus according to claim 1,
wherein the vehicle further includes a generator that generates an electric power for charging the storage device with an aid of a motive power of the internal combustion engine, and
the second mode is a mode in which the internal combustion engine is so operated as to cause the generator to generate an electric power that can hold the storage amount of the storage device within a predetermined range.

9. A control method for a vehicle that includes an internal combustion engine, a catalyst for purifying an exhaust gas of the internal combustion engine, a storage device capable of being charged with an electric power from a power supply outside the vehicle, and a rotational electrical machine driven by an electric power of the storage device, and that has, as, running modes, a first mode in which the vehicle runs with an aid of a motive power of the rotational electrical machine with the internal combustion engine stopped in principle so as to give higher priority to consumption of the electric power of the storage device than to conservation thereof and a second mode in which the vehicle runs with an aid of a motive power of the internal combustion engine and a motive power of the rotational electrical machine with the internal combustion engine operated according to need so as to give higher priority to conservation of the electric power of the storage device than to consumption thereof, comprising:
performing intermittent control to intermittently operate the internal combustion engine in accordance with a required discharge amount, namely, an amount of an electric power to be discharged from the storage device even in the first mode when a predetermined condition on warm-up of the catalyst is fulfilled during the first mode; and
calculating the required discharge amount on a basis of a temperature of the internal combustion engine when the intermittent control is performed during the first mode.

10. The control method according to claim 9, further comprising
detecting a temperature of a coolant for the internal combustion engine, and
calculating the required discharge amount such that the intermittent control during the first mode makes the internal combustion engine more likely to be operated as the temperature of the coolant for the internal combustion engine falls.

11. The control method according to claim 9, further comprising
operating the internal combustion engine when a required power calculated by subtracting the required discharge amount from a power needed for running of the vehicle is larger than a first threshold, in performing the intermittent control during the first mode,
stopping the internal combustion engine when the required power is smaller than a second threshold smaller than the first threshold, and
calculating the required discharge amount as a value that decreases as the temperature of the internal combustion engine falls.

12. The control method according to claim 9, further comprising
continuing to operate the internal combustion engine instead of stopping the internal combustion engine when a time during which the internal combustion engine continues to be operated is shorter than a predetermined time in a case where the internal combustion engine is in operation through the intermittent control during the first mode.

13. The control method according to claim 9, further comprising
calculating the required discharge amount on a basis of a temperature of the internal combustion engine and a cumulative operation time of the internal combustion engine during the first mode.

14. The control method according to claim 13, further comprising
calculating the required discharge amount such that the intermittent control during the first mode makes the internal combustion engine more likely to be operated as the temperature of the internal combustion engine falls and as the cumulative operation time decreases.

15. The control method according to claim 9,
wherein the vehicle runs in the first mode before a storage amount of the storage device becomes smaller than a lower limit, and runs in the second mode after the storage amount of the storage device becomes smaller than the lower limit, and
the predetermined condition is a condition that the internal combustion engine be operated to complete control for warming up the catalyst in response to a decrease in the storage amount of the storage device below an amount larger than the lower limit by a predetermined amount.

* * * * *

UNITED STATES PATENT AND TRADEMARK OFFICE
CERTIFICATE OF CORRECTION

| | | |
|---|---|---|
| PATENT NO. | : 8,694,187 B2 | Page 1 of 1 |
| APPLICATION NO. | : 13/266939 | |
| DATED | : April 8, 2014 | |
| INVENTOR(S) | : M. Yamazaki et al. | |

It is certified that error appears in the above-identified patent and that said Letters Patent is hereby corrected as shown below:

In the Specification

Col. 1, line 3, after the title, insert

-- This is a 371 national phase application of PCT/JP2010/001854 filed 28 July 2010, claiming priority to Japanese Patent Application No. 2009-200026 filed 31 August 2009, the contents of which are incorporated herein by reference. --

Signed and Sealed this
Seventh Day of October, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,694,187 B2
APPLICATION NO. : 13/266939
DATED : April 8, 2014
INVENTOR(S) : M. Yamazaki et al.

It is certified that error appears in the above-identified patent and that said Letters Patent is hereby corrected as shown below:

In the Specification

Col. 1, line 3, after the title, insert

-- This is a 371 national phase application of PCT/IB2010/001854 filed 28 July 2010, claiming priority to Japanese Patent Application No. 2009-200026 filed 31 August 2009, the contents of which are incorporated herein by reference. --

This certificate supersedes the Certificate of Correction issued October 7, 2014.

Signed and Sealed this
Twenty-seventh Day of January, 2015

Michelle K. Lee
*Deputy Director of the United States Patent and Trademark Office*